March 26, 1946.  E. J. CHMIELOWIEC  2,397,455
SPRAYING DEVICE
Filed Oct. 7, 1941  2 Sheets-Sheet 1
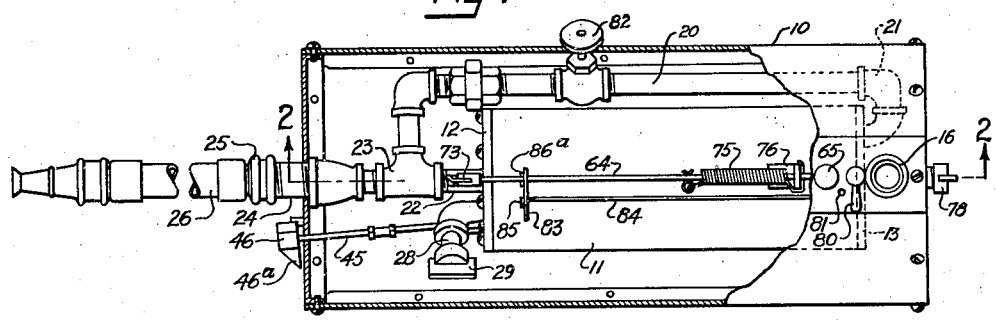
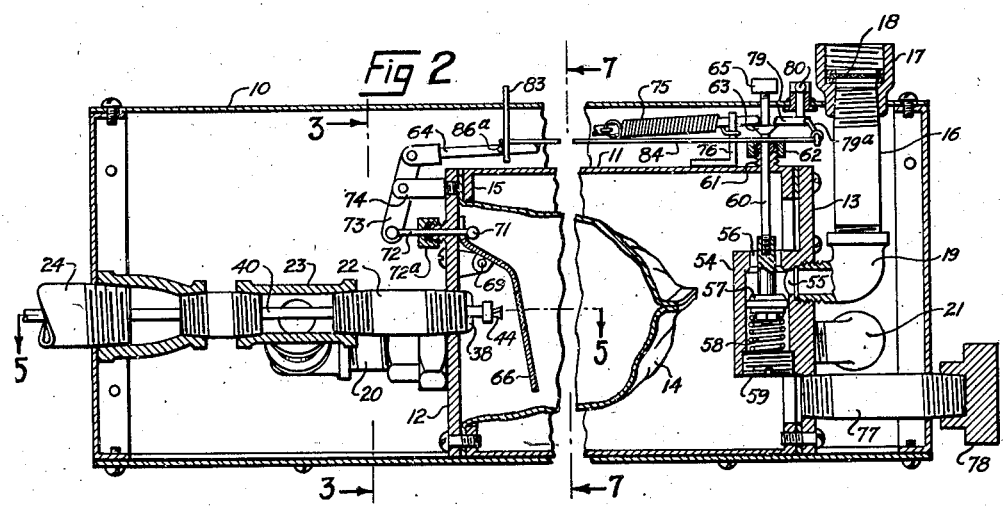
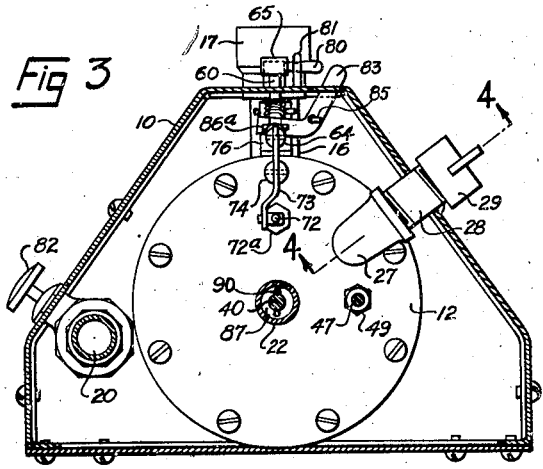
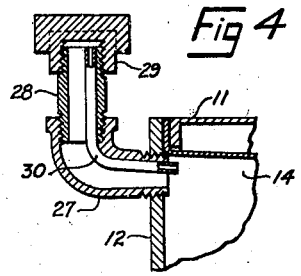
INVENTOR
EDWARD J. CHMIELOWIEC
BY
ATTORNEY March 26, 1946.  E. J. CHMIELOWIEC  2,397,455
SPRAYING DEVICE
Filed Oct. 7, 1941  2 Sheets-Sheet 2
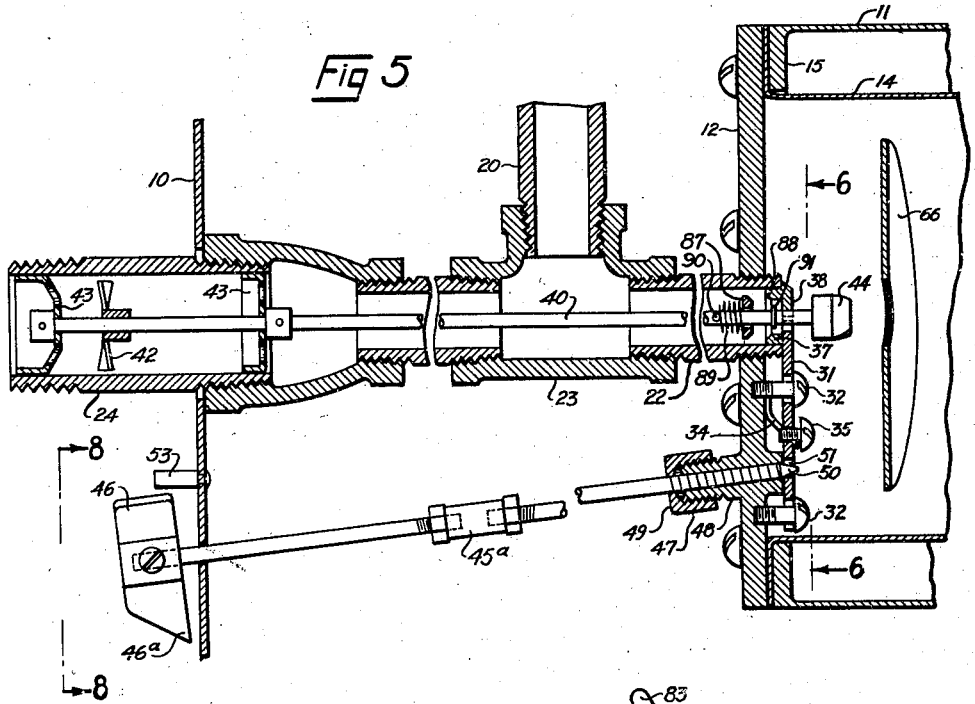
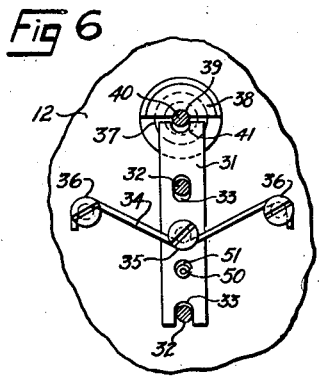
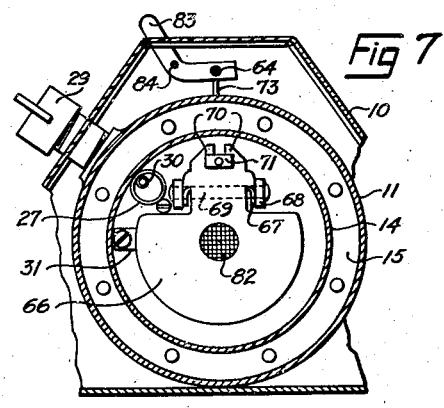
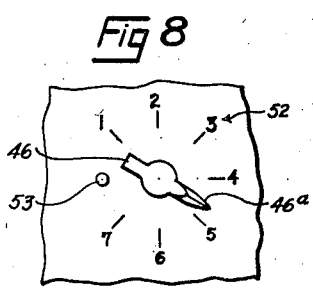
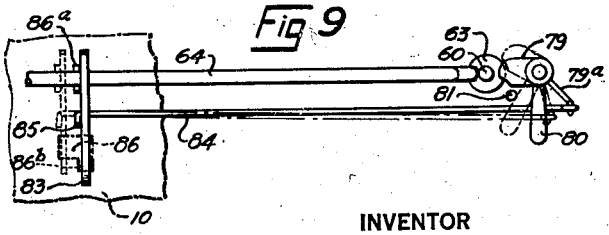
INVENTOR
EDWARD J. CHMIELOWIEC
BY
ATTORNEY Patented Mar. 26, 1946

2,397,455

UNITED STATES PATENT OFFICE 2,397,455

SPRAYING DEVICE

Edward J. Chmielowiec, Glenville, Conn., now by judicial change of name Edward J. Chalmers, assignor of two-fifths to Nellie Chalmers, Glenville, Conn.

Application October 7, 1941, Serial No. 413,926

11 Claims. (Cl. 299—85)

This invention relates to improvements in spraying machines of the general class employed for the ejection and distribution under pressure of fluids, for example, insecticide mixtures; the invention in its broader aspects being directed to increasing the scope of utility and the operating efficiency of such devices in general through the provisions of novel controls capable under different settings of varying the functional performance of the sprayer according to prevailing conditions and such controls being particularly useful in connection with an insecticide sprayer of the character illustrated and described in my pending application Serial No. 363,187, filed October 28, 1940; the present application being a continuation in part of said pending application.

Among the objects of the present invention are the provision of a combination of valve means for alternatively or selectively conditioning a sprayer to eject under constant pressure either a single prepared solution or mixture only or such mixture in some desired changed state such as a diluted state or as an admixture; the provision of valve control means operative automatically to stop operation of the sprayer upon depletion of the prepared mixture and also manual means for stopping its operation whenever desired before such depletion; and the provision of additional manual control means for selectively altering the action of the sprayer, either to cause it to cease discharging the prepared mixture at any time and discharge water only, or to continue in operation after depletion of the mixture for subsequently useful purposes such as flushing or otherwise treating a sprayed area, a water flushing operation, for example, being often desirable and sometimes essential in the case of insecticides in order to effect either a more thorough spreading of or a carrying-in to an effective depth of the deposited solution. It may be pointed out too that the devices provided by the invention for selectively conditioning a sprayer for performance in these various ways are so arranged as to enable the machine to be refilled or to stand idle without requiring disconnection or control from the source of energy such as a water supply line the normal shut-off point of which indeed may be located quite remote from the machine.

Another object of the invention is to provide novel means for agitating the mixture to be ejected, such means being driven by the flow of fluid through certain passages at the outlet end of the machine and the agitation taking place out of contact with sludge or sediment.

Still another object is to provide automatic protection against back flow into the chamber of the machine containing the prepared mixture when the machine stands idle or when it operates for flushing purposes after depletion of the contents of said chamber, the arrangement being such that attention need be given to the regulating valve provided for the outlet of the chamber in question only when it is desired to prevent ejection from the chamber as when refilling it or flushing, or to alter the rate of ejection therefrom.

The arrangement of valves and controls as herein provided is useful not merely from the standpoint of enabling a spraying machine to perform alternatively different desired or required functions, but from the standpoint also of greater economy, convenience and efficiency than heretofore attained. And while this is perhaps more especially so for an insecticide sprayer it will be evident that the improvements according to the invention are admirably suited for adaption to sprayers in general for chemical solutions, paints and other fluids and to machines employing a gas or a vapor as the medium for effecting forcible ejection of the spray and/or for producing a desired mixture or solution at the point of ejection.

As to a sprayer intended primarily for insecticides both economy and convenience result from the fact that the pressure medium (for example, water) is cut off automatically upon depletion of the insecticide, thus avoiding waste and the necessity for an attendant once the machine has been set into operation. Efficiency arises from the fact that the ejected spray may be more accurately and more flexibly controlled as to its state of concentration when ejected and after being distributed, it being well known that for the many different horticultural and biological purposes for which sprayers are employed the requirements vary widely, some requiring the deposit of a definite formula not suited to dilution or to blending as by mingling with other fluids while spraying; others requiring such dilution or blending as is best obtained during the spraying operation, and these or still others requiring a flushing operation after deposit of the spray solution in one or another state.

The construction, arrangement and combination of elements for attaining the foregoing objects and advantages will be explained hereinafter in detail in connection with the accompanying drawings, and many variations and modifications of the specific embodiment herein disclosed, merely by way of example, will become apparent to those skilled in the art. It is to be understood, therefore, that the invention is not restricted to the particular embodiment and type of sprayer herein shown and described, the scope of the invention being limited only insofar as specified in the claims.

In the accompanying drawings:

Fig. 1 is a plan view of a spraying machine constructed primarily for ejecting insecticides and embodying the improvements according to the invention, the outer casing being partly broken away to show the parts within.

Fig. 2 is a longitudinal elevation, in section, taken on the line 2—2 of Fig. 1.

Fig. 3 is an elevation, in section, taken on the line 3—3 of Fig. 2.

Fig. 4 is a fragmentary sectional view taken on the line 4—4 of Fig. 3.

Fig. 5 is a fragmentary sectional view on an enlarged scale, taken on the line 5—5 of Fig. 2, and shows in detail the valve between the collapsible bag and the outlet and the back-flow valve in the outlet.

Fig. 6 is a fragmentary elevation viewed from the line 6—6 in Fig. 5, and shows details of the valve between the bag and outlet.

Fig. 7 is a fragmentary elevation, in section, taken on the line 7—7 of Fig. 2.

Fig. 8 is a fragmentary elevation viewed in the direction of the line 8—8 in Fig. 5 and shows the dial for indicating the setting of the receptacle outlet valve.

Fig. 9 is a plan view showing the parts related to the master shut-off control of the invention in different positions.

As already pointed out, the improvements according to the present invention are arranged for embodiment in a sprayer intended primarily for ejecting insecticides and employing water as the pressure medium for effecting ejection, and in the present instance such embodiment is shown in connection with a constant pressure sprayer of this character such as illustrated and described in my pending application, Serial No. 363,187, filed October 28, 1940, wherein there is disclosed some although not all of the improvements now to be described.

Referring to the drawings, the numeral 10 designates the housing or outer casing of the machine which is shaped for minimum space requirements, convenience in transporting and stability of support on its flat base. Within the casing 10 and supported rigidly thereby in suitable manner is a tank or container 11 which may be cylindrical, as shown, and provided at its opposite ends with heads 12 and 13 which preferably are removably secured thereto. A receptacle 14 in the nature of a collapsible bag made of flexible material such as rubber or any durable commercial form of fluid-tight fabric is disposed within the container 11 and is preferably secured therein with an open side facing the head 12 of the latter, the skirt of the bag being firmly secured and sealed between the head 12 and a flange 15 of the container. The receptacle 14 serves to hold in isolation from the interior of the container a supply of insecticide or other fluid mixture in one or another form and state of concentration.

A water inlet pipe 16 extends through the top of the housing 10, and the outside of the housing is provided with a hose coupling 17 to which water under pressure may be supplied to the container 11, there being a strainer 18 in the coupling 17 to prevent entry of foreign matter. The pipe 16 is connected by an elbow 19 to the head 13 of the container.

A water discharge passage pipe 20 is disposed within the housing 10 and extends longitudinally of the exterior of the container 11, one end of the pipe 20 communicating with the interior of the container as by an elbow connection 21 in the head 13 and the other end being connected as by a T fitting 23 to an outlet pipe 22 in the opposed head 12 of the container. The pressure of water within the container, entering the latter through the inlet supply pipe 16, serves to compress the bag 14 the interior of which communicates with the outlet pipe 22 so that the insecticide contained in the bag is ejected through the outlet pipe 22 and if not otherwise prevented mingles with the water stream entering the outlet pipe from the passage 20.

A pipe 24 connected to the T 23 extends exteriorly of the housing 10 where it is equipped with a suitable coupling such as a hose attachment 25 to which a spraying hose 26 is attached. Obviously, any desired spraying or distributing fixture may be attached to the coupling 25 or an equivalent thereof, for example, a whirler.

For filling the bag 14 with insecticide, either in liquid or powder form, there is provided a fitting 27 in the head 12 of the cylinder for communication with the interior of the bag, as best shown in Fig. 4. A nipple 28 is connected to the fitting 27 and is closed by a suitable removable closure such as a cap nut 29, a vent pipe 30 secured in the nipple and in the fitting 27 allowing air to escape from the bag as the insecticide is being supplied through the nipple 28.

Means is provided for feeding and regulating the supply of insecticide into the stream of water arriving at the outlet pipe 22 from the passage 20 (if and when such mingling function is desired) such means comprising a slide valve 31, best shown in Fig. 6, on the cylinder head 12 within the bag 14, screws 32 passed through elongated slots 33 in the valve and tapped into the head retaining the valve in place. A wire spring 34 freely engaged around a screw 35 threaded into the valve between the screws 32 with its outer ends hooked around screws 36 secured to the head on opposite sides of the valve constantly urges the valve to closed position with the screws 32 engaging one end wall of each slot 33.

A bushing 37 snugly fitted into the inner end of the outlet pipe 22, as best shown in Figures 5 and 6, has a flange 38 which is substantially semicircular and overlies one-half of the inner end of the pipe 22. The flange 38 is provided centrally with a semi-circular opening 39 of less diameter than the bore of the bushing, said opening forming a half bearing for an agitator rod 40, later described. The half portion of the inner face of the bushing 37 which is not flanged forms a flat bearing surface or seat for one end of the slide valve 31, and said end of the slide valve (overlying the other half of the end of pipe 22) is provided with a semi-circular opening 41 adapted to encircle the half of the agitator rod 40 not encircled by opening 39 in flange 38 when the valve is closed and thus cut off communication between the interior of the bag and the outlet pipe 22. When valve 31 is open, as shown in Fig. 6, the wall of the semi-circular opening 41 is spaced from the rod 40 and the end of the slide is also spaced from the straight edge of the flange 38, thus providing an open passage for communication between the interior of the bag and the outlet pipe 22.

The agitator rod 40 is equipped with angular vanes or blades 42 within the pipe 24 and is supported for rotation in disks 43 fixedly disposed in said pipe at spaced intervals, as shown, and provided, of course, with suitable apertures for the free flow of liquid through the pipe. Within the bag 14 the rod 40 is equipped with similar blades 44. Water flowing through the pipe 24 against blades 42 causes rotation of rod 40 to which these blades and blades 44 are secured whereby blades 44 agitate the insecticide within the bag and indirectly effect the mixing up of sediment. The importance of the disposition of blades 44 as herein provided will shortly be pointed out in connection with avoiding clogging of the insecticide passage around rod 40 and slide valve 31.

For regulating the open position of the slide valve 31 whereby to vary the rate of discharge from the bag and/or the concentration of the ultimately ejected spray, there is provided a control rod 45 the outer end of which extends through the adjacent end wall of housing 10, as clearly indicated in Figs. 1 and 5, and is equipped with a handle 46. The inner end of rod 45 is provided with screw threads 47 which engage the tapped bore of a nipple 48 communicating with the interior of the bag through the cylinder head 12. A gland nut 49 is threaded onto the nipple 48 to provide a leak-proof connection and the inner end of rod 45 is provided with a conical tip 50 which engages an aperature 51, see Figs. 5 and 6, formed in the slide valve 31, such engagement enabling movement of the slide, through turning of the handle 46, to effect any desired adjustment of the opening of said valve for the passage of insecticide to the outlet pipe 22.

For indicating the adjustment of the slide valve 31, handle 46 of the control rod 45 is equipped at one end with a pointer 46ª, best shown in Fig. 8, which moves over a dial 52 displayed on the end wall of the casing 10. A stop pin 53 limits movement of the handle 46 in either direction and when the pointer 46ª is against one side of the stop pin the conical cam tip 50 of the control rod will be retracted and permit spring 34 to close the valve 31 entirely. As the handle is turned to move the pointer clockwise toward the opposite side of the stop pin, the control rod 45 will be screwed into the nipple 48 and advance the conical cam tip 50 into the opening 51 to move the valve to the desired open position against the tension of spring 34. The sliding action of valve 31 has the advantage over needle or plunger types of valves in that it has a more efficient cleaning action, a turn or two of handle 46 between open and closed positions being sufficient ordinarily to readily free the passage around rod 40 even of stubborn clogging particles, and the churning effect of the agitator blades 44 disposed close to said passage aiding in carrying off most clogging substances.

According to the invention, means is provided for controlling the flow of water from the inlet pipe 16 into the container 11, said means comprising a manual control for opening an inlet valve whereby to set the machine in operation, mechanism for retaining said valve open and operative automatically to release the valve to permit it to close upon depletion of the contents of the bag, an auxiliary manual control for preventing closing of the valve when automatically released whereby to permit continued operation of the machine, and a further master manual control for releasing the valve to stop the machine instantly whenever desired. Thus there is provided within the container 11 and integral with or secured to the inner side of head 13 a valve chamber 54 communicating with the inlet pipe 16 through a port 55 and with the interior of the container through a port 56. A plunger valve 57 is supported in the chamber 54 on a helical compression spring 58 resting on a screw plug 59 which closes the lower end of the chamber. Spring 58 constantly urges valve 57 upwardly into seating position for closing the port 56 and thus cutting off the supply of water to the interior of the container 11. The valve is held open against the pressure of spring 58 by a member suitably associated with the valve, for example, carried on the valve stem 60 exteriorly of the container and cooperative with a retaining device, all as will shortly appear. As here shown, the valve stem 60 projects through a nipple 61 on the upper wall of the container; a gland nut 62 being threaded on the nipple to effect a leak-proof connection. The valve stem 60 may be provided with any suitable cam member, such as an inverted frustum-shaped collar 63, the sloping side of which is adapted, upon depressing the valve, to ride over and cam back the end of a spring-pressed valve retaining rod 64 (rounded at its end for easy camming action), there being provided a knob or button 65 for manually depressing the valve, and rod 64 snapping into engagement over collar 63 to hold the valve open whenever it is depressed far enough to effect such engagement.

The rod 64 constitutes one member of a train of connections provided for automatically releasing valve 57 to shut off the water supply to the interior of container 11 when the insecticide in the bag 14 becomes depleted or at other times as later pointed out. Such train of connections includes as another member a lever 66 preferably disposed within the bag 14, see Figs. 2 and 7, and of substantially semicircular shape, it being hingedly supported on a pintle 69 passing through aligned lugs 67 and 68 provided respectively on the lever 66 and the container head 12. The shape and size of lever 66 is such as to prevent folding of the collapsed bag around it in such manner as might injure the bag or result in tangling and jamming. Beyond its hinge lugs the lever 66 is provided with a fork 70 against which engages the transverse head 71 of a rod 72 passing through the fork, as best shown in Figs. 2 and 7. Rod 72 passes through a gland nut 72ª in the head 12 of container 11 and is loosely connected to one end of a link 73 pivoted intermediate its ends on a post 74 disposed on the exterior of the head 12, the valve retaining rod 64 previously referred to being freely connected to the other end of the link 73. A spring 75 is connected to rod 64 and to a bracket 76 on the exterior of the container 11, rod 64 being slidably supported in an opening in said bracket. It will be apparent that when rod 64 is engaged over collar 63 the connections just described between the rod and lever 66 will, under the influence of spring 75, hold lever 66 in the outwardly swung position within bag 14, as shown in Fig. 2, and that engagement of link 73 against the gland nut 72ª limits the distance that lever 66 can be rocked from such outwardly swung position (a distance insufficient to permit contact of lever 66 with the agitator blades 44).

The spring 75 tends constantly to urge the rod 64 toward the collar 63 on the valve stem 60 but when the contents of the bag 14 become depleted, the bag will collapse under water pressure in the container and press against the lever 66 with sufficient force to actuate the aforementioned train of connections, rocking of lever 66 then resulting in retracting rod 64, against the tension of spring 75, off the collar 63, and spring 58 acting immediately to press the plunger valve 57 upwardly into position for closing the inlet 56. Under such condition the container 11 is no longer under the pressure of water and ejecting action and useful operation of the sprayer naturally ceases unless otherwise caused to continue as by means hereinafter to be described.

For draining the container 11 in order to enable the bag to be refilled, a drain pipe 77 extends from the head 13 through an end wall of the casing 10, the exposed end of the drain pipe being provided with a suitable removable closure such as a screw cap 78. It will be obvious that removal of the cap 78 simply disposes of the static head of water so as to enable expansion of the bag upon refilling. During such refilling the valve 57 is, of course, closed so that water cannot enter the drained out container from the inlet pipe 16 and slide valve 31 should also be set at closed position in order to prevent leakage into the outlet passage 22 of the solution being poured into the bag. However, should valve 31 be inadvertently left open while refilling the bag, an auxiliary valve primarily provided as a protection against back-flow into bag 14, as hereinafter described, will serve in most instances to prevent leakage.

The invention provides an auxiliary control for the inlet valve 57 which control is settable at will into active and inactive positions so as to permit or prevent response of the valve, as desired, to the automatically actuated release therefor, that is, to the automatic retraction of the valve retaining rod 64 under the influence of the collapsed bag 14. Such auxiliary control may comprise an elongated plate or disk 79, as shown, secured eccentrically to the lower end of the vertical arm of a bent lever 80 and disposed in active position for engagement over the collar 63 when valve 57 is depressed manually and when the externally exposed handle portion of the lever 80 lies crosswise of the casing 10 as indicated in Fig. 1. Lever 80 is supported for turning in a suitable bushing in the top of the casing 10 adjacent to the valve depressor button 65. By turning lever 80 so that its handle lies against a pin 81 in the casing 10 the disk 79 is disposed in inactive position.

When set in active position (which may be done at any time although most conveniently when valve 57 is depressed to start operation of the machine) disk 79 of the aforesaid auxiliary control serves to oppose closing movement of valve 57 when its retaining rod 64 is retracted automatically by the action of the collapsed bag on lever 66, the machine then continuing to operate to eject a stream of water (or other medium flowing through the inlet pipe 16) for the useful purpose of following the insecticide spray (as a continuing function in the absence of on attendant) with a flushing operation whereby to effect such dilution, distribution or soaking-in of the deposited spray as may be desired. When the auxiliary valve control lever 80 is set in inactive position or out of the path of movement of valve 57 the machine will cease operation, as already pointed out, as soon as the supply of insecticide is depleted, valve 57 then being free to respond to the automatic release action of rod 64.

In order to enable the machine to eject nothing but a specific prepared mixture with which the bag 14 may be filled (without dilution or mingling such mixture with water or such other fluid or agent as may be directed into pipe 16, container 11 and along passage 20) there is provided a hand operated valve 82 at some convenient point along the passage 20, see Figs. 1 and 3. Valve 82 when closed serves to cut off the passage 20 entirely so that nothing but the contents within bag 14 under pressure of water in the container 11 will be forced into the outlet 22 and out of the spray nozzle. And valve 82 may be opened to different extents whereby to vary the amount of water allowed to mingle with a unit volume of the insecticide or the like in bag 14 forced by the collapse of said bag into the outlet pipe 22 through slide valve 31.

From the foregoing it will be apparent that by manipulation of valves 82 and 31 the concentration of the ejected spray may be varied and controlled to suit a wide range of requirements. Through operation of the automatic release devices 63, 64, 66 and the auxiliary manual control 79, 80 for the inlet valve 57 the machine may be conditioned to eject under constant pressure a desired blended spray mixture (ingredients from the bag and the passage 20) and to automatically shut off upon depletion of the contents of the bag, or to continue operating subsequent to collapse of the bag for the purpose of ejecting fluid such as water coming over the passage 20 and useful for flushing. In short, once the machine is connected up for spraying purposes at some point remote from a source of energy such as a water supply line or other pressure medium, it will perform certain of a number of useful functions automatically and perform others upon or in response to manual manipulation of the various valves herein provided directly on the machine, thus eliminating to a large extent the need for an attendant and in any event without requiring at any time either disconnection or control from the source of energy. Moreover, whether or not the contents of the bag 14 are depleted the slide valve 31 may be closed manually whenever desired in order to intervene with a flushing operation which would result, of course, from the flow of water through the passage 20 whenever valve 82 is left open.

When ejection from the bag is stopped, as for the purpose of an intervening flushing operation as aforesaid or because it is desired to set the machine aside, sedimentation may naturally take place within the bag. It is for this reason (and others already explained) and for the purpose at all times of assuring, during operating of the machine, a thorough mixing of the contents within the bag 14, that the agitator blades 44 are provided. And it will be observed that these blades are disposed above any level to which sediment or sludge is likely to rise so that they produce a mild but effective churning only of the fluid and this in turn breaks up the sediment without danger of driving clots into the orifice of slide valve 31. A grilled or screened aperture 82 in the lever 66 aids in the free circulation of the fluid within the bag 14 under the influence of the agitator blades 44. It will be evident too that the arrangement for and method of agitation as herein provided is conducive to the general efficiency of the machine, agitation within the bag reducing the chance of waste of the contents from sedimentation and assuring a uniform mix of the contents upon delivery through the outlet valve 31, and the blades 42 serving to further aid the blending of the mingling fluids from the passage 20 and the outlet valve. Another feature arising out of the arrangement wherein the agitator rod 40 passes through and in fact amounts to a cooperative element of the slide valve 31 is that by moving the slide member of the valve substantially to closed position rotation of rod 40 against the end wall of the slide which encircles the rod will act to disturb and clear away any adherent particles both on the rod and the valve, thus aiding in keeping the valve open for free ejection of fluid therethrough. And it may be noted too that the valve regulating rod 45 is provided with a turnbuckle 45a, as clearly shown in Fig. 5, which serves to adjust the slide 31 relative to the conical tip 50 and rod 40 to the end that, as desired, the slide may be closed tight enough to actually stop rotation of rod 40 or may be set just loose enough to allow the rod to continue to rotate to effect a cleaning action on the walls of the valve.

For convenience and as a safety measure in the event of an emergency or other necessity arising, there is provided a master manual control lever 83 rockably supported on rod 64 and shaped to extend laterally of the rod and then upward through a slot 86 in the casing 10. A rod 84 is arranged to slide freely in a hole through a portion of the lever 83 disposed inside the casing 10, the end of the rod adjacent to the lever being bent over as at 85 to form a stop against the lever when the rod is pulled to the right by movement of the auxiliary control lever 80 into active position, the other end of the rod 84 having an eye engaging over the hook-like end of a pin 79a projecting from the disk 79. By reference especially to Figs. 2 and 9 it will be seen that operation of the machine may be stopped instantly at any time simply by rocking lever 83 slightly upward and pushing it to the left in which direction it is free to move in the slot 86 in casing 10, slot 86 having a notch 86b at one side and at the end of the slot where lever 80 stands at rest against a pin 86a in rod 64, and the lever lying by gravity in said notch so as not to move to the left with rod 64 when the latter is actuated automatically. Due to the pin 86a in rod 64 movement of lever 83 to the left retracts the valve retaining rod 64 from engagement with the collar 63 so as to release valve 57 for closing. And if the auxiliary valve retainer 79, 80 happens to be set in active position when lever 83 is operated the valve thus released will close since the connecting rod 84 between lever 83 and disk 79 will assure movement of the latter to inactive position where handle 80 rests against pin 81. The free sliding fit of rod 84 in lever 83 permits unhindered independent movement at all times of lever 80 to and from active position, it being apparent that after operating lever 83, spring 75 acts to snap it and also rod 64 to the right whereupon the bent-over end 85 of rod 84 will stand away from lever 83. It may be noted here that should lever 80 be turned into active position when valve 57 is in closed position, the edge of disk 79 is formed with a downward slope so that it will be cammed back readily by the complementary slope on collar 63 when the valve is depressed to open position.

There remains to be discussed the automatic protection providing against back-flow into the bag 14 of fluid in the passage 20 or outlet 22 or in the pipe 24 and the hose line 26 coupled thereto. It will be evident that if, in the absence of an attendant, the machine stops automatically or continues to operate (due to retainer 79 being set in active position) for flushing purposes—all as herein provided for—slide valve 31 will remain open. Assuming the machine has stopped, pressure of the static head of fluid in the container 11, passage 20 and outlet line 24, 26 may result in back-flow of such fluid through the open valve 31 into the bag, especially if the machine stands idle at a level below the extension of the outlet line 26. Such back-flow is objectionable since it naturally results in dilution or pollution of the mixture within the bag or the refill substance when placed therein.

Therefore, as a protection against such back-flow and so that attention need not be given to valve 31 except for closing it when desired to switch to flushing before the bag is empty or to regulate the rate of flow from the bag, there is provided a ring valve 87, see Fig. 5, which fits on the agitator rod 40 just freely enough to slide longitudinally for a limited distance toward and away from the inner face of bushing 37, the latter having an annular bevel 88 forming a seat for the complementary beveled edge around the opposed face of valve 87. Valve 87 may be urged constantly toward its seat against bushing 37 by a light spring 89 encircling rod 40 and retained from movement away from valve 87 by a pin 90 in the rod, or the spring may be omitted, if desired, so as to leave valve 87 free simply to float between its seat against bushing 37 and the pin 90 when fluid pressure acts against either side face of the valve. Spring 89, if indeed it is employed, is so light as easily to yield to permit valve 87 to open when subjected to the flow of fluid from the bag 14 under ejection pressure of water in the container 11. However, when such pressure is removed, as when the bag is empty and the machine has stopped due to release of the inlet valve 57 by the collapsed bag, valve 87 will move to its seat under the urge of spring 89 and the back pressure against said valve of fluid in the outlet lines and static fluid in container 11 and the discharge passage 20. A packing ring 91 snugly held in a slight annular groove formed in rod 40 serves to seal the clearance opening between rod 40 and the ring valve, such opening being large enough to allow the valve to slide without danger of binding on the rod.

It will be evidence that valve 87 also serves the useful function of a safety for preventing back-flow into the bag of fluid in the outlet lines if valve 31 should be left open while refilling the bag 14. In such event, and with the container 11 drained (as it is when refilling the bag), the back pressure against valve 87 of static fluid in the outlet lines, if such fluid be present, or the valve spring alone if the outlet lines are empty, is sufficient to hold the valve seated tight enough to prevent leakage past it in either direction.

The spraying machine constructed as herein described including the mechanism operative to retain the inlet valve 57 opened and to automatically release it for closing upon depletion of the contents of the bag is substantially the same as illustrated and described in my prior pending application hereinbefore referred to and of which the present application is a continuation in part, the devices and controls herein disclosed including the auxiliary valve retainer 79, 80, the valve 82, the master control lever 83 and the back-flow valve 87 being improvements over said prior application.

Having thus described my invention, I claim:

1. A fluid spraying machine for spraying a mixture of a prepared fluid and a pressure fluid, said machine comprising, in combination, a container having an inlet for fluid under pressure; inlet valve mechanism comprising an element acting to urge the valve to inlet closing position, means for moving the valve manually to inlet opening position and releasable means for retaining it at such position in opposition to the element urging it closed; a collapsible bag for holding in isolation from the pressure fluid a prepared fluid mixture, said bag being disposed within the container in communication only with an outlet therefrom; a pressure fluid passage connected for communication between the interior of the container and said outlet, and means operating in response to collapse of the bag to release the inlet valve retaining means, whereby to shut off the flow of pressure fluid to said outlet simultaneously with exhaustion of the prepared fluid in the bag.

2. The combination set forth in claim 1, wherein the releasable inlet valve retaining means specified comprises an inverted frustrum-shaped part carried by the means for moving the inlet valve to inlet opening position, a member having means holding it yieldingly in a position for deflection by said part and operative in response to opening of the valve to move into overlying engagement with said part, and a lever operatively connected to said member for moving the latter from engagement with said part, said lever being pivotally mounted on the container and having an arm held by said member in a position for rocking movement by collapse of the bag, to effect such disengagement.

3. The combination set forth in claim 1, wherein the releasable inlet valve retaining means is constituted by a part carried by the valve opening means, a rod movably mounted on the container and urged by a spring into engagement with said part in the valve opening position of the valve opening means, an element pivotally mounted on the container within the collapsible bag therein, responsive means cooperative with said element and said rod and operating in response to collapse of the bag to move the rod in opposition to its spring to disengage it from said part, said spring through said responsive means resiliently retaining said element in position for actuation by the bag, and a lever operatively connected to said rod for moving it manually from engagement with said part.

4. The combination set forth in claim 1, wherein the means for moving the inlet valve to inlet opening position carries a part operative in the open position of the valve to engage the releasable valve retaining means; and including additionally in the recited combination, an auxiliary inlet valve retaining member settable manually to a position overlying said part and operative, when so set, to engage said part and retain the inlet valve open upon release of the releasable valve retaining means from said part.

5. The combination set forth in claim 1, including additionally: an auxiliary inlet valve retaining member settable manually into engagement with a part carried by the valve opening means, in the valve opening position of said means, said auxiliary member being operative, when so set, to retain the valve open upon release of the releasable valve retaining means, and means operatively connected to said auxiliary member and said releasable means for manual actuation of them jointly to valve releasing position.

6. A fluid spraying machine for spraying a predetermined mixture of a prepared fluid and water, said machine having a collapsible bag for holding the prepared fluid, a container enclosing said bag, an inlet for water under pressure into the space between the outside of the bag and inside of the container for collapsing the bag, a prepared fluid outlet connected for communication with interior of the bag and an adjustable outlet valve placed to control the flow of such fluid through said outlet, a pressure water passage connected for communication between the interior of the container and a point in the prepared fluid outlet beyond the valve in the latter for mixing of the prepared fluid and water at said point, an inlet valve spring-pressed to closed position and provided with an actuator for manually opening it, means for latching said inlet valve in the open position upon manual actuation of it to that position, and means responsive to the collapse of the bag to release said latching means.

7. A fluid spraying machine for spraying a mixture of a prepared fluid and a pressure fluid, said machine having a collapsible bag for holding the prepared fluid, a container enclosing said bag, an inlet for the pressure fluid into the space between the outside of the bag and inside of the container for collapsing the bag, an outlet connected to the container in communication with the interior of said bag and a pressure fluid passage connected for communication between the interior of the container and said outlet, an inlet valve spring-pressed to the closed position and provided with an actuator for manually opening it, means for latching said actuator and by it said valve in inlet opening position upon manual actuation of the valve to that position, means responsive to the collapse of the bag to release said latching means, and means settable manually into engaging relation with said actuator and operative upon release of said latching means to retain the actuator and by it the inlet valve in inlet opening position after collapse of the bag.

8. A fluid spraying machine for spraying a predetermined mixture of a prepared fluid and water; said machine having a collapsible bag for holding the prepared fluid and a container enclosing said bag; an outlet pipe connected to the container in communication with the interior of the bag and an outlet valve placed to control the flow of fluid from the bag to said pipe, said outlet valve comprising opposed fixed and movable members providing an adjustable opening between them; an inlet valve spring-pressed to closed position and provided with an actuator for manually opening it to admit water under pressure into the container for collapsing the bag therein; means cooperative with said actuator for latching the inlet valve in open position upon actuation of it to that position and means responsive to collapse of the bag to release said latching means; a pressure water passage connected for communication between the interior of the container and a point in said outlet pipe beyond the outlet valve therein; an agitator shaft supported for rotation in said outlet pipe and extending into the bag through the opening in the outlet valve, the movable member of said valve being adjustable relative to said shaft and to the fixed valve member to regulate the outlet valve opening; vanes secured to a portion of the agitator shaft within the outlet pipe and having a helical pitch for rotating the shaft under the influence of water flowing through the pressure water passage to the outlet pipe so long as the inlet valve is open, and agitating vanes secured to a portion of the agitator shaft within the bag for stirring the fluid in said bag before such fluid passes through the outlet valve.

9. A fluid spraying machine according to claim 8, wherein the agitator shaft recited therein constitutes a member of the outlet valve, and wherein the fixed and movable members of said valve are mounted on the container and formed so as together to completely encircle the agitator shaft when the valve is closed, and wherein the movable valve member is connected to an adjusting rod provided with a pointer for indicating the setting of said valve member relative to the fixed valve member and the agitator shaft in accordance with a graduated scale.

10. A fluid spraying machine having a collapsible bag for holding a prepared fluid and a container enclosing said bag, said container having an inlet for water under pressure for collapsing the bag and an outlet pipe connected to a wall thereof and in communication with the interior of the bag; a passage for the flow of water from the interior of the container to a point in said outlet pipe beyond its connection to the container; an outlet valve comprising opposed fixed and movable members mounted on the wall of the container adjacent to the connection thereto of the outlet pipe and means for adjusting the movable valve member to regulate the flow to said pipe of fluid from the bag; a valve in the water passage from the container to the outlet pipe for regulating the flow of water to said pipe; an agitator shaft supported for rotation in the outlet pipe and extending into the bag through the outlet valve, the fixed and movable members of said valve each being recessed to encircle oppositely disposed portions of the agitator shaft and providing between them and said shaft the opening in said outlet valve; vanes secured to a portion of the agitator shaft within the outlet pipe and shaped for imparting rotation to the shaft under the influence of the fluid mixture flowing through said pipe, and vanes secured to a portion of said shaft which extends into the bag for agitating the prepared fluid in the bag before such fluid passes through the opening in the outlet valve.

11. A fluid spraying machine according to claim 6, wherein the actuator for manually opening the inlet valve is provided with a part moved thereby to a position to latch with the valve latching means in the open position of the valve; and wherein there is provided an auxiliary inlet valve retaining member settable manually into the path of movement of said part when the valve is either open or closed, said auxiliary member being operative, when so set and the inlet valve is in open position, to engage said part to retain said valve open after release of said latch, and said part having a cam surface operative by contact with the auxiliary member upon opening the valve to move said member out of its path.

EDWARD J. CHMIELOWIEC.